United States Patent [19]
Leube et al.

[11] Patent Number: 5,996,489
[45] Date of Patent: *Dec. 7, 1999

[54] USE IN ROTOGRAVURE PRINTING OF PAPER-COATING COMPOUNDS WITH A HIGH BUTADIENE CONTENT

[75] Inventors: Hartmann F. Leube, Ludwigshafen; Dirk Lawrenz, Maxdorf; Wolfgang Gärber, Wachenheim, all of Germany

[73] Assignee: BASF Aktiengesellschaft, Ludwigshafen, Germany

[ * ] Notice: This patent issued on a continued prosecution application filed under 37 CFR 1.53(d), and is subject to the twenty year patent term provisions of 35 U.S.C. 154(a)(2).
This patent is subject to a terminal disclaimer.

[21] Appl. No.: 08/973,557

[22] PCT Filed: Jun. 11, 1996

[86] PCT No.: PCT/EP96/02530

§ 371 Date: Dec. 22, 1997

§ 102(e) Date: Dec. 22, 1997

[87] PCT Pub. No.: WO97/01000

PCT Pub. Date: Jan. 9, 1997

[30] Foreign Application Priority Data

Jun. 21, 1995 [DE] Germany .......................... 195 22 400

[51] Int. Cl.$^6$ .............................. B41M 1/10; D21H 19/10
[52] U.S. Cl. .......................... 101/170; 428/511; 428/513; 524/819
[58] Field of Search .................... 101/170; 428/511–514; 524/819–824

[56] References Cited

U.S. PATENT DOCUMENTS

| | | | |
|---|---|---|---|
| 3,897,375 | 7/1975 | Takahashi et al. | 260/8 |
| 4,065,423 | 12/1977 | Hen | 260/29.7 H |
| 4,950,711 | 8/1990 | Suwala et al. | 524/819 |
| 5,141,988 | 8/1992 | Suwala et al. | 524/548 |
| 5,284,908 | 2/1994 | Fujiwara et al. | 524/718 |
| 5,354,800 | 10/1994 | Suzuki et al. | 524/460 |
| 5,637,644 | 6/1997 | Tsuroka et al. | 524/828 |
| 5,700,852 | 12/1997 | Iwanaga et al. | 523/201 |
| 5,703,157 | 12/1997 | Fujiwara et al. | 524/822 |
| 5,759,347 | 6/1998 | Leube et al. | 162/135 |
| 5,786,100 | 7/1998 | Tsuroka et al. | 428/511 |
| 5,846,381 | 12/1998 | Wirth et al. | 162/135 |

FOREIGN PATENT DOCUMENTS

| | | |
|---|---|---|
| 1 0408099 | 1/1991 | European Pat. Off. . |
| 6184995 | 7/1994 | Japan . |
| 7002911 | 1/1995 | Japan . |
| 7048423 | 2/1995 | Japan . |
| 7053609 | 2/1995 | Japan . |
| 95/11342 | 4/1995 | WIPO . |

OTHER PUBLICATIONS

Dr. R. Groves (Doverstrand Limited), Styrene Butadiene Latex Design and its effect in Paper Application, Presented at 'Paper Week 84' organized by P.I.T.A. in Bristol, Mar. 13$^{th}$–15$^{th}$, 1984.

*Primary Examiner*—Stephen R. Funk
*Attorney, Agent, or Firm*—Oblon, Spivak, McClelland, Maier & Neustadt, P.C.

[57] ABSTRACT

A method of printing paper by gravure printing, wherein the paper used is coated with a paper-coating slip containing a binding agent having a butadiene content of at least 74 wt %, based on the binding agent.

14 Claims, No Drawings

USE IN ROTOGRAVURE PRINTING OF PAPER-COATING COMPOUNDS WITH A HIGH BUTADIENE CONTENT

BACKGROUND OF THE INVENTION

1. Field of the Invention

The invention relates to a method of printing paper by gravure printing.

2. Description of the Background

In gravure printing the printing form has indentations which receive the printing ink which is transferred to the paper during printing. To achieve good printability, ie ready acceptance of the printing ink, the paper to be printed must exhibit as smooth a surface as possible; furthermore, the paper should have a high degree of flexibility, so that it bears well against the indentations when taking up ink.

A measure of the printing quality in the gravure printing process is, eg, the number of missing dots.

Furthermore, reduction in the concentration of binding agent in the paper-coating slips is required, as a result of which there arise increased demands on the pigment-binding power of the binding agents. It is also desirable to minimize the printing ink consumption without incurring loss of printing quality.

The paper to be printed is generally coated with a paper-coating slip.

Due to the peculiarities of the gravure printing process there also arise particular demands on the paper to be printed or the paper-coating slip.

EP-A 408,099 reveals binding agents having a butadiene content of from 0 to 100 wt %. Binding agents having a butadiene content of ca 36 wt % in paper-coating slips are used in said reference according to the examples.

Styrene Butadiene Latex Design and its Effect in Paper Applications, R. Groves (Minutes of Paper Week, 13–15.03.1984 in Bristol) reveals that the butadiene content in binding agents for paper-coating slips is usually from 30 to 45 wt %,

SUMMARY OF THE INVENTION

It is an object of the present invention to provide a method of printing paper which particularly well satisfies the demands of gravure printing.

Accordingly, we have found a method of printing paper by gravure printing, wherein the paper is coated with a paper-coating slip containing a binding agent having a butadiene content of at least 65 wt %, based on the binding agent.

DETAILED DESCRIPTION OF THE INVENTION

The statements below relate to preferred embodiments of the method of the invention.

The paper-coating slips contain, apart from pigment, binding agent as a substantial component. The binding agent is an ionically or preferably free radically polymerized polymer having a butadiene content of at least 65 wt %, preferably at least 74 wt %.

The polymer may be composed, in particular, of the following monomers:

| | |
|---|---|
| 65–100 wt % | of butadiene |
| 0–35 wt % | of $C_1$–$C_{10}$ alkyl (meth)acrylates or vinyl aromatic compounds (referred to below as the main monomers), |
| 10 wt % | of ethylenically unsaturated acids, acid anhydrides or amides (referred to below as auxiliary monomers) and |
| 0–30 wt % | of other monomers. |

The polymer preferably consists of

| | |
|---|---|
| 65–99.5 wt % of | butadiene |
| 0–34.5 wt % of | main monomers |
| 0.5–15 wt % of | auxiliary monomers and |
| 0–30 wt % of | other monomers. |

More preferably, the polymer consists of

| | |
|---|---|
| 74–95 wt % of | butadiene |
| 4–25 wt % of | main monomers |
| 1–8 wt % of | auxiliary monomers and |
| 0–5 wt % of | other monomers. |

Most preferably, the polymer consists of

| | |
|---|---|
| 79–90 wt % of | butadiene |
| 9–20 wt % of | main monomers |
| 1–8 wt % of | auxiliary monomers and |
| 0–5 wt % of | other monomers. |

Examples of suitable main monomers are methyl (meth)acrylate, ethyl (meth)-acrylate, propyl (meth)acrylate, butyl (meth)acrylate and 2-ethylhexyl (meth)-acrylate and also α-methylstyrene and styrene.

Styrene and n-butyl acrylate are particularly preferred.

Examples of suitable auxiliary monomers are unsaturated carboxylic acids and/or their amides and/or anhydrides, such as acrylic acid, acrylamide, methacrylic acid, methacrylamide or itaconic acid, maleic acid, fumaric acid, vinylsulfonic acid, vinylphosphonic acids or acrylamidopropanesulfonic acid and the water-soluble salts thereof.

Other suitable monomers are acrylonitrile, methacrylonitrile, vinyl esters of carboxylic acids containing up to 20 C atoms, particularly vinyl acetate and vinyl propionate, vinyl stearate and vinyl laurate, olefins capable of being polymerized by free-radical polymerization, eg ethylene and vinyl or vinylidene halides such as vinyl chloride or vinylidene chloride.

The glass transition temperature ($T_g$) of the polymer is preferably from −80° to 25° C., more preferably from −80° to 0° C. and most preferably from −70° to −6° C. The $T_g$ can be calculated after Fox, Bull. Am. Phys. Soc. (Ser II) 1, 123 (1956) from the $T_g$ of the monomers.

Preferably the polymer is prepared by emulsion polymerization. There is obtained an aqueous dispersion of dispersed polymer particles. The particle size can be adjusted to a desired magnitude by simple means, such as varying the amount of emulsifier or the stirrer speed. In particular, better adjustment of the particle size can be achieved by using, initially, a polymer seed, ie a polymer dispersion in which the dispersed polymer particles have a particle size of, say, from 20 to 50 nm.

The dispersions finally obtained usually exhibit number-average particle sizes in a range extending from 10–1000 nm, particularly from 20–500 nm, more preferably irom 50 to 200 nm and most preferably from 100 to 160 nm. Both bi-modal and multi-modal particle size distributions can be of advantage.

The polymerization may be carried out using conventional free radical polymerization initiators.

Suitable free radical polymerization initiators are all those capable of initiating free radical aqueous emulsion polymerization. They can be peroxides, eg, alkali metal peroxodisulfates, dibenzoyl peroxide, γ-butyl perpivalate tert-butyl per-2-ethyl-hexanoate, 2,5-dimethyl-2,5-di(tert-butylperoxy)hexane, cumene hydroperoxide, or azo compounds such as azobisisobutyronitrile, 2,2'-azobis(2-amidinopropane)-dihydrochloride.

Also suitable are combined systems which are composed of at least one organic reducing agent and at least one peroxide and/or hydroperoxide, eg tert-butyl hydroperoxide and the sodium metal salt of hydroxymethanesulfinic acid or hydrogen peroxide and ascorbic acid. Furthermore, combined systems are suitable which contain a small amount of a metal compound which is soluble in the polymerization medium and whose metal component may be present in more than one valence, eg ascorbic acid/iron (II) sulfate/hydrogen peroxide, where ascorbic acid may be frequently replaced by hydroxymethanesulfinic acid, sodium sulfite, sodium hydrogen sulfite, or sodium metabisulfite and hydrogen peroxide may be replaced by tert-butyl hydroperoxide or alkali metal peroxodisulfate and/or ammonium peroxodisulfate. Usually the amount of free radical initiator system used, based on the total amount of the monomers to be polymerized is from 0.1 to 3 wt %. It is particularly preferred to use, as initiator, ammonium and/or alkali metal peroxodisulfates as such or as components of combined systems. It is particularly preferred to use sodium peroxodisulfate.

The manner in which the free radical initiator system is fed to the polymerization vessel during the course of the free radical aqueous emulsion polymerization of the invention is known to the person possessing average skill in the art. It can be initially placed in the polymerization vessel in its entirety or alternatively fed in continuously or stepwise at the rate at which it is consumed during the free radical aqueous emulsion polymerization. Specifically, this depends on the chemical nature of the initiator system and on the polymerization temperature, as is well known to the person possessing average skill in the art. Preferably a portion is initially placed in the polymerization zone and the remainder is fed thereto at the rate at which it is consumed.

In the case of emulsion polymerization there may usually be used known ionic and/or non-ionic emulsifiers and/or protective colloids or stabilizers.

Suitable surface-active substances of this kind are all of the protective colloids and emulsifiers that are conventionally used as dispersing agents. A detailed description of suitable protective colloids is to be found in Houben-Weyl, Methoden der organischen Chemie, Vol. XIV/1, Makromolekulare Stoffe, Georg-Thieme-Verlag, Stuttgart, 1961, pp 411–420. Suitable supplementary emulsifiers are anionic, cationic, and non-ionic emulsifiers. It is preferred to use, as supplementary surface-active substances, exclusively emulsifiers whose relative molecular weight is, unlike the protective colloids, usually below 2000. Of course, when use is made of mixtures of surface-active substances, the individual components must be intercompatible, which can be checked, in case of doubt, by carrying out a few preliminary tests. Preferably anionic and non-ionic emulsifiers are used as supplementary surface-active substances. Commonly used supplementary emulsifiers are eg ethoxylated fatty alcohols (degree of ethoxylation: 3 to 50, alkyl radical; $C_8-C_{36}$), alkali metal salts of dialkyl esters of sulfosuccinic acid, as well as alkali metal and ammonium salts of alkyl sulfates (alkyl radical: $C_8-C_{12}$), of ethoxylated alkyl phenols (degree of ethoxylation: 3 to 50, alkyl radical: $C_4-C_9$), of alkylsulfonic acids (alkyl radical $C_{12}-C_{18}$), and of alkylarylsulfonic acids (alkyl radical $C_9-C_{18}$).

Other suitable dispersing agents are compounds of the general formula II

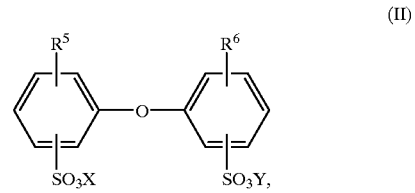

(II)

in which $R^5$ and $R^6$ denote hydrogen or $C_4-C_{14}$ alkyl and are not both concurrently hydrogen, and X and Y may be alkali metal ions and/or ammonium ions. Preferably $R^5$ and $R^6$ denote linear or branched alkyl radicals of from 6 to 19 carbon atoms or hydrogen and, in particular, containing 6, 12, and 16 carbon atoms, where $R^5$ and $R^6$ are not concurrently hydrogen. X and Y are preferably sodium, potassium or ammonium ions, sodium being particularly preferred. Particularly advantageous are compounds II in which X and Y are sodium, $R^5$ is a branched alkyl radical containing 12 carbon atoms and $R^4$ is hydrogen or $R^5$. Frequently commercial mixtures are used which exhibit a content of from 50 to 90 wt % of the monoalkylated product, for example DOWFAX® 2A1 (registered trade mark of the Dow Chemical Company).

Other suitable emulsifiers are mentioned in Houben-Weyl, Methoden der organischen Chemie, Vol. XIV/1, Makromolekulare Stoffe, Georg Thieme Verlag, Stuttgart, 1961, pp 192–208.

The dispersions may also be prepared using a protective colloid in addition to the emulsifier present or without any emulsifier, the amount of the protective colloid being up to 100 wt %, preferably from 0.5 to 30 wt %, based on the amount of monomers used.

From a process engineering viewpoint, this protective colloid can be added completely or partly, concurrently or non-concurrently, together with or separately from, the monomers; it may be of advantage to place an initial amount of protective colloid in aqueous solution in the polymerization zone, this amount being up to 30 wt %, preferably up to 10 wt %, based on monomers.

Natural protective colloids which may be mentioned are starch, casein, gelatine, and alginates, and as modified natural products there may be mentioned hydroxyethylcellulose, methylcellulose and carboxymethylcellulose, and also cationically modified starch. Suitable synthetic protective colloids include poly (acrylic acid) and salts thereof, polyacrylamide, water-soluble acrylic acid copolymers, water-soluble acrylamide copolymers, polyvinylpyrrolidone, poly(vinyl alkohol)s, and partially saponified poly(vinyl alkohol)s.

It may be an advantage if part of the protective colloid is grafted to the polymer.

The emulsion polymerization is usually carried out at from 30° to 95° C., preferably from 75° to 90° C. The polymerization medium may comprise water only or be a mixture of water and water-miscible liquids such as methanol. Preferably only water is used. The emulsion polymerization can be carried out as a batch process or in the form of a feed process, using a stepped or continuous gradient method. A feed process is preferred in which a portion of the polymerization batch is placed in the polymerization zone and heated to the polymerization temperature to cause incipient polymerization, after which the remainder of the polymerization batch is fed to the polymerization zone, usually via a number of discrete feed streams, one or more of which contain the monomers in a pure or emulsified form, continuously, stepwise, or with respect to a superposed concentration gradient, while maintaining polymerization.

Of course, the free radical aqueous emulsion polymerization of the invention may be effected under elevated or reduced pressure if desired.

In the emulsion polymerization there may be used chain-stopping substances, referred to below as modifiers, such as tert-dodecylmercaptan, carbon tetra-chloride, carbon tetrabromide, trichlorobromomethane, butylmercaptan, allyl alcohol, poly(THF-co-bisthiol), mercaptoethanol, acetylacetone, thioglycolic acid, or thioglycolate. Preferably such substances are added to the reaction mixture in admixture with the monomers to be polymerized. The concentration of the chain-stopping substances is preferably from 0 to 2 wt %, more preferably from 0 to 1 wt % and most preferably from 0 to 0.5 wt %, based on the polymer.

The aqueous polymer dispersions of the polymer are usually prepared having a solids contents of from 15 to 75 wt %, preferably from 40 to 60 wt %.

The dispersion may contain usual auxiliaries such as caustic potash, ammonia or ethanolamine as neutralizing agents, silicone compounds to act as defoaming agents, biozides, and also silicone oils or waxes to reduce tackiness.

The paper-coating slips contain the polymer as binding agent, preferably in amounts of from 1 to 20 wt %, particularly from 5 to 15 wt %, based on the pigment concentration of the paper-coating slips (these data relate to the polymer as such and not to the dispersion).

Usually pigments are the main component of the paper-coating slips. Frequently used pigments are for example barium sulfate, calcium carbonate, calcium sulfoaluminate, kaolin, talcum, titanium dioxide, zinc oxide, chalk, or clay slip.

Furthermore, the paper-coating slips may contain usual dispersing agents. Suitable dispersing agents are polyanions of, for example, poly(phosphoric acid) or poly(acrylic acid) (poly salts) usually present in amounts of from 0.1 to 3 wt %, based on the amount of pigment.

In addition, the paper-coating slips may contain so-called "co-binders". Examples of natural co-binders are starch, casein, gelatine and alginates, and examples of modified natural products are hydroxyethylcellulose, methylcellulose and carboxy-methylcellulose, and also cationically modified starch. Alternatively, use may be made of conventional synthetic co-binders, eg those based on vinyl acetate or vinyl acrylate.

These may be present in amounts of from 0.1 to 10 wt %, based on the weight of the pigment.

For the preparation of the paper-coating slip the components are mixed in known manner, the polymer being generally used in the form of an aqueous dispersion.

The water content of the paper-coating slip is usually adjusted to from 25 to 60 wt %, based on the paper-coating slip.

The paper-coating slip can be applied to the paper to be coated by conventional methods (cf Ullmann's Encyclopädie der Technischen Chemie, 4th Edition, Vol. 17, pp 603 et seq).

The paper to be coated may be paper of greatly varying thicknesses, including cardboard and the like.

The papers are preferably coated with paper-coating slip (dry) at a rate of from 2 g/m$^2$ to 50 g/m$^2$.

The coated paper is printed by known gravure printing processes.

The coated paper has a high degree of smoothness and good gloss. Its good printability in gravure printing is also demonstrated by the small number of missing dots.

EXAMPLES

Preparation of dispersions based on styrene-butadiene

Dispersion 1 ($D_1$).

Initial mixture:

| | |
|---|---|
| 17.0 kg of demineralized water | |
| 2.14 kg of polystyrene seed dispersion (solids content 35%, particle size: 38 nm, stabilized with 10% of arylsulfonate (sodium dodecylbenzenesulfonate) | |
| 5% of | feed 1 |
| 25% of | feed 2 |

Feed 1

| | |
|---|---|
| 18.6 kg of | demineralized water |
| 42.5 kg of | butadiene |
| 5.0 kg of | styrene |
| 1.75 kg of | acrylic acid |
| 1.5 kg of | acrylamide, 50% strength in water |
| 0.3 kg of | tert-dodecylmercaptan |
| 2.50 kg of | sodium laurylsulfate, 15% strength in water. |

Feed 2

| | |
|---|---|
| 0.4 kg of | sodium persulfate |
| 7.0 kg of | demineralized water. |

The initial mixture was heated to 85° C. and incipiently polymerized over a period of 15 min. The remainder of feed 1 was added over a period of 7 hours while the addition of feed 2 started at the same time as feed 1 but continued over a period of 7.5 hours. Polmerization was then allowed to continue for a further 2 hours at 85° C. There was obtained a dispersion having a particle size (Malvern Autosizer) of 146 nm and having a solids content of 50%. The glass transition temperature as −65° C.

Dispersion 2 ($D_2$).

Initial mixture:

| | |
|---|---|
| 17.0 kg of demineralized water | |
| 2.14 kg of polystyrene seed dispersion (solids content 35%, particle size: 38 nm, stabilized with 10% of arylsulfonate (sodium dodecylbenzenesulfonate) | |
| 5% of | feed 1 |
| 25% of | feed 2 |

Feed 1

| | |
|---|---|
| 18.6 kg of | demineralized water |
| 35.0 kg of | butadiene |
| 12.5 kg of | styrene |
| 1.75 kg of | acrylic acid |
| 1.5 kg of | acrylamide, 50% strength in water |

-continued

| | |
|---|---|
| 0.3 kg of | tert-dodecylmercaptan |
| 2.50 kg of | sodium laurylsulfate, 15% strength in water |

Feed 2

| | |
|---|---|
| 0.4 kg of | sodium persulfate |
| 7.0 kg of | demineralized water. |

The initial mixture was heated to 85° C. and incipiently polymerized over a period of 15 min. The remainder of feed 1 was added over a period of 7 hours while the addition of feed 2 started at the same time as feed 1 but continued over a period of 7.5 hours. Polmerization was then allowed to continue for a further 2 hours at 85° C. There was obtained a dispersion having a particle size (Malvern Autosizer) of 153 nm and having a solids content of 50%. The glass transition temperature was −49° C.

Dispersion 3 ($D_3$).

Initial mixture:

| | |
|---|---|
| 17.0 kg of demineralized water | |
| 2.14 kg of polystyrene seed dispersion (solids content 35%, particle size: 38 nm, stabilized with 10% of arylsulfonate (sodium dodecylbenzenesulfonate) | |
| 5% of | feed 1 |
| 25% of | feed 2 |

Feed 1

| | |
|---|---|
| 18.6 kg of | demineralized water |
| 42.5 kg of | butadiene |
| 5.0 kg of | butyl acrylate |
| 1.75 kg of | acrylic acid |
| 1.5 kg of | acrylamide, 50% strength in water |
| 0.3 kg of | tert-dodecylmercaptan |
| 2.50 kg of | sodium laurylsulfate, 15% strength in water |

Feed 2

| | |
|---|---|
| 0.4 kg of | sodium persulfate |
| 7.0 kg of | demineralized water. |

The initial mixture was heated to 85° C. and incipiently polymerized over a period of 15 min. The remainder of feed 1 was added over a period of 7 hours while the addition of feed 2 started at the same time as feed 1 but continued over a period of 7.5 hours. Polmerization was then allowed to continue for a further 2 hours at 85° C. There was obtained a dispersion having a particle size (Malvern Autosizer) of 147 nm and having a solids content of 50%. The glass transition temperature was −77° C.

Dispersion 4 ($D_4$) (for comparison)

Initial mixture:

| | |
|---|---|
| 17.0 kg of demineralized water | |
| 2.14 kg of polystyrene seed dispersion (solids content 35%, particle size: 38 mm stabilized with 10% of arylsulfonate (sodium dodecylbenzenesulfonate) | |
| 5% of | feed 1 |
| 25% of | feed 2 |

Feed 1

| | |
|---|---|
| 18.6 kg of | demineralized water |
| 26.0 kg of | butadiene |
| 21.5 kg of | styrene |
| 1.75 kg of | acrylic acid |
| 1.5 kg of | acrylamide, 50% strength in water |
| 0.3 kg of | tert-dodecylmercaptan |
| 2.50 kg of | sodium laurylsulfate, 15% strength in water |

Feed 2

| | |
|---|---|
| 0.4 kg of | sodium persulfate |
| 7.0 kg of | demineralized water. |

The initial mixture was heated to 85° C. and incipiently polymerized over a period of 15 min. The remainder of feed 1 was added over a period of 7 hours while the addition of feed 2 started at the same time as feed 1 but continued over a period of 7.5 hours. Polmerization was then allowed to continue for a further 2 hours at 85° C. There was obtained a dispersion having a particle size (Malvern Autosizer) of 145 nm and having a solids content of 50%. The glass transition temperature was −17° C.

Dispersion 5 ($D_5$) (for comparison)

Initial mixture:

| | |
|---|---|
| 17.0 kg of demineralized water | |
| 2.14 kg of polystyrene seed dispersion (solids content 35%, particle size: 38 nm stabilized with 10% of arylsulfonate (sodium dodecylbenzenesulfonate) | |
| 5% of | feed 1 |
| 25% of | feed 2 |

Feed 1

| | |
|---|---|
| 18.6 kg of | demineralized water |
| 26.0 kg of | butadiene |
| 21.5 kg of | styrene |
| 1.75 kg of | acrylic acid |
| 1.5 kg of | acrylamide, 50% strength in water |
| 0.6 kg of | tert-dodecylmercaptan |
| 2.50 kg of | sodium laurylsulfate, 15% strength in water |

Feed 2

| | |
|---|---|
| 0.4 kg of | sodium persulfate |
| 7.0 kg of | demineralized water. |

The initial mixture was heated to 85° C. and incipiently polymerized over a period of 15 min. The remainder of feed 1 was added over a period of 7 hours while the addition of feed 2 started at the same time as feed 1 but continued over a period of 7.5 hours. Polmerization was then allowed to continue for a further 2 hours at 85° C. There was obtained a dispersion having a particle size (Malvern Autosizer) of 141 nm and having a solids content of 50%. The glass transition temperature was −16° C.

The composition of the polymers in percent by weight is given in Table 1 below.

TABLE 1

| Polymer of: | Butadiene | Styrene | n-Butyl Acrylate | Acrylic Acid | Acrylamide |
|---|---|---|---|---|---|
| $D_1$ | 85 | 10 | 0 | 3.5 | 1.5 |
| $D_2$ | 70 | 25 | 0 | 3.5 | 1.5 |
| $D_3$ | 85 | 0 | 10 | 3.5 | 1.5 |
| $D_4$ | 52 | 43 | 0 | 3.5 | 1.5 |
| $D_5$ | 52 | 43 | 0 | 3.5 | 1.5 |

The dispersions were used as binding agents in a paper-coating slip of the following composition (parts are by weight).

| | |
|---|---|
| 50 parts of | finely divided clay |
| 50 parts of | coarsely divided clay |
| 0.75 parts of | viscosity modifier (Sterocoll ® D sold by BASF) |
| 0.2 parts of | a sodium salt of a poly(acrylic acid) having a molecular weight of 4000 (poly salt sold by BASF) |
| 4.5 parts of | binding agent dispersion (according to $D_1$–$D_5$) solids content: 56% |
| pH: 8.5 to 9 | (adjusted with NaOH). |

These paper-coating slips were subjected to further processing in the following manner:

As base paper there was used a coating base paper without cellulose and having a gsm substance of 38 g/m². The coating slip was applied to both sides of the paper at a rate of 10 g/m² on each side using a pilot coating machine (application by roller, blade proportioning) operated at a speed of 1000 m/min. The paper web was adjusted to a moisture content of 5.0% by means of an IR drying unit and airdrying.

The paper web was glazed by a single pass through a super calendering unit. The line pressure was 250 kN/m, the web speed 300 m/min and the temperature 80° C.

Application tests

A) Determination of the dry pick resistance using an I.G.T. Specimen Printer

The test strips were printed with increasing speed. The maximum printing speed was 100 cm/s. The ink was applied at a line pressure of 35 kp/cm.

In the so-called pick analysis the first pick point (ie the first point at which the paper-coating slip tears away from the paper) is noted and the pick points are counted up to the 10th pick point.

The dry pick resistance is given in cm/s, ie the printing speed at which the 10th pick point occurs.

B) The determination of gloss was carried out according to DIN 54.502 at an angle of 75°. High values mean high gloss.

C) The determination of the smoothness was effected as specified in DIN 53.107 (determination of smoothness by the Bekk method).

D) Roughness determination was carried out on the basis of the following specifications:

| | |
|---|---|
| DIN 4762 | surface roughness |
| DIN 4768 | determination of the roughness parameters $R_{a1}$ $R_z$ and $R_{max}$ using an electric contact stylus instrument. |

The instrument used was the Hommel Tester T 20 A sold by Hommelwerke.

The reading given as a measure of the degree of roughness is the $R_a$ value.

E) Determination of the missing dots was carried out on the basis of the NF Q 61— 002—Helio Test—on an I.G.T. Printing tester AIC 2/5. On the printed test strips the distance in mm was measured over which 20 missing dots occurred.

The results of the tests A–E are given in the table below.

| Binding Agent | I.G.T. Test A | Gloss B | Smoothness C | Roughness D | Helio Test E |
|---|---|---|---|---|---|
| $D_1$ | 45 | 60 | 1950 | 0.95 | 70 |
| $D_2$ | 47 | 55 | 1840 | 0.89 | 68 |
| $D_3$ | 43 | 57 | 1860 | 1.03 | 71 |
| $D_4$* | 35 | 47 | 1170 | 1.29 | 73 |
| $D_5$* | 33 | 49 | 1340 | 1.35 | 75 |

*for comparison

As can be seen from the table of results, the products of the invention are distinctly superior to the products known to the person skilled in the art in respect of binding power, gloss, smoothness, and roughness.

We claim:

1. A method comprising printing paper by gravure printing, wherein the paper used is coated with a paper-coating slip containing a pigment and a polymeric binding agent having a butadiene content of at least 74 wt %, based on the binding agent.

2. The method as defined in claim 1, wherein the paper is coated with paper-coating slip at a rate of from 2 g/m² to 50 g/m².

3. The method as defined in claim 1, wherein the concentration of the binding agent in the paper-coating slip is from 1 to 20 wt %, based on the pigment content.

4. The method as defined in claim 1, wherein the binding agent used is a copolymer of from 74 to 95 wt % of butadiene,
from 4 to 25 wt % of a $C_1$–$C_{10}$ alkyl (meth)acrylate or a vinylaromatic compound containing up to 20 carbon atoms
from 1 to 8 wt % of an ethylenically unsaturated acid, an acid anhydride or an amide, and
from 0 to 5 wt % of other monomers.

5. The method as defined in claim 1, wherein the binding agent is prepared by emulsion polymerization and has a weight-average particle size of from 50 to 200 nm.

6. The method as defined in claim 1, wherein preparation of the binding agent is carried out by polymerization in the presence of from 0 to 1 wt % of a modifier, based on the binding agent.

7. The method of claim 1, wherein the binding agent has a butadiene content of at least 79 wt %.

8. The method of claim 7, wherein the binding agent has a butadiene content of at least 85 wt %.

9. Paper coated with a paper-coating slip, wherein the paper-coating slip contains a binding agent having a butadiene content of at least 74 wt %.

10. The paper coated with a paper-coating slip of claim 9, wherein the binding agent has a butadiene content of at least 79 wt %.

11. The paper coated with a paper-coating slip of claim 10, wherein the binding agent has a butadiene content of at least 85 wt %.

12. Paper obtained by gravure printing the paper as defined in claim 9.

13. The paper of claim 12, wherein the binding agent has a butadiene content of at least 79 wt %.

14. The paper of claim 13, wherein the binding agent has a butadiene content of at least 85 wt %.

* * * * *